Nov. 8, 1938.　　W. R. GORHAM　　2,135,639
TURRET CENTERING AND LOCKING MECHANISM
Filed Oct. 4, 1937
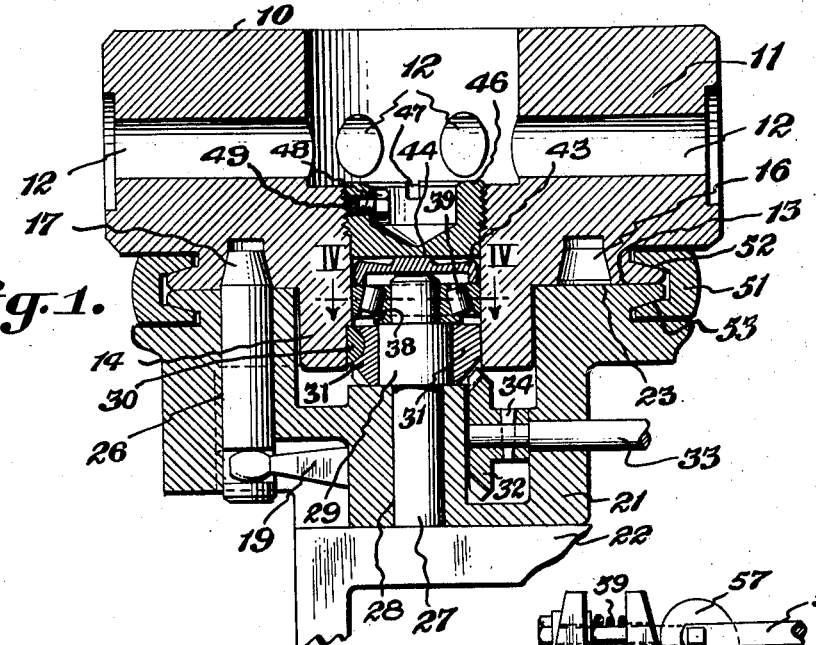
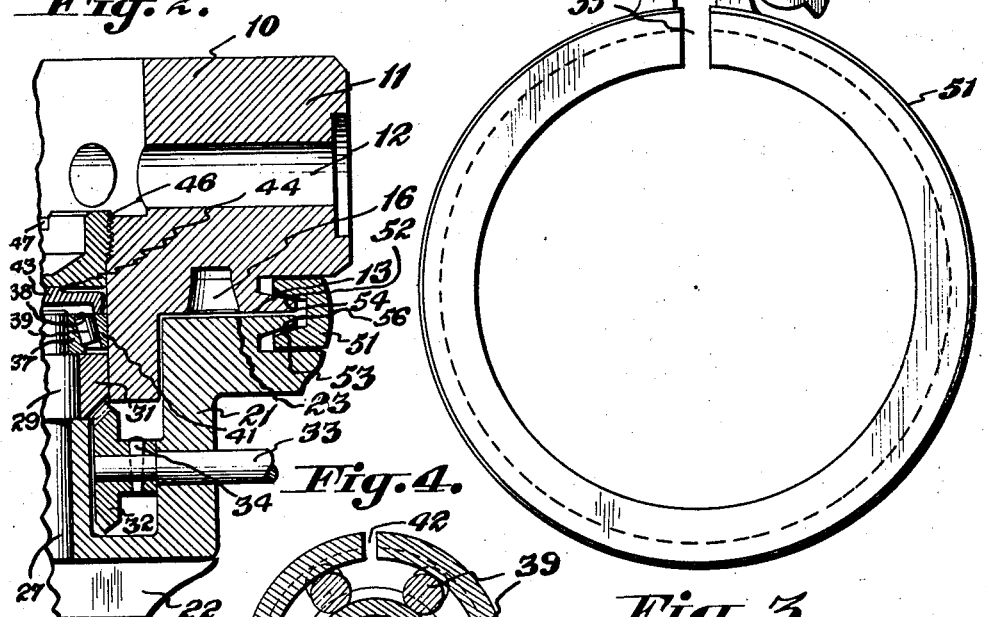
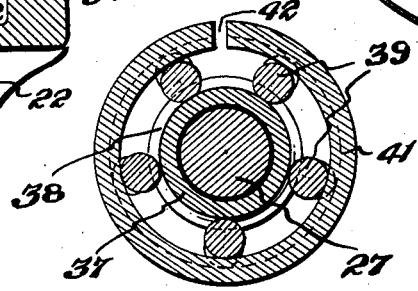
INVENTOR:
William R. Gorham
BY
Glascock Downing Seebold
ATTORNEYS.

Patented Nov. 8, 1938

2,135,639

UNITED STATES PATENT OFFICE 2,135,639

TURRET CENTERING AND LOCKING MECHANISM

William R. Gorham, Shibuya-ku, Tokyo, Japan

Application October 4, 1937, Serial No. 167,299

5 Claims. (Cl. 29—49)

The present invention relates to tool holders for turret lathes and more particularly pertains to such devices wherein a number of different tools are mounted to perform the several operations necessary in machining a workpiece. More specifically the invention relates to improved means for centering and locking such a tool holder.

The time required to revolve the ordinary turret or to index the tool holder from a position permitting work engagement with one tool to another of such positions frequently represents a large portion of the total time required to complete the machining of a workpiece. Modern turret lathes are usually operated at relatively high spindle speeds and are thus capable of finishing the various parts of a workpiece in a few seconds even though several machining operations are required. Accordingly it will be appreciated that the time consumed in indexing the turret may represent a considerable portion of the total time required to complete the finishing of a particular workpiece.

It is therefore an object of the present invention to provide means whereby said turrets may be revolved freely and quickly to reduce the time required for effecting an index of the turret.

Another object of the invention resides in the provision of means for reducing the friction between the relatively movable parts of the device or between the turret and the mounting support so that the turret may be easily revolved.

A further object of the invention is to provide means for improving the accuracy of which any of the tools mounted on the turret may be moved and locked in a workpiece engaging position.

A more specific object of the invention resides in the provision of means for creating pressure on the bearing which supports the turret so as to eliminate any clearance therein resulting from wear, temperature variation or other causes, whereby the turret will be rigidly held in a particular indexed position.

Other and further features and objects of the invention will be more apparent to those skilled in the art upon consideration of the accompanying drawing and the following description wherein an exemplary embodiment of the invention is disclosed.

In the drawing:

Figure 1 is a vertical section of a turret tool post illustrating the arrangement of the various elements in a locked position.

Fig. 2 is a similar section of a portion of the post showing the position of the elements in an unlocked position.

Fig. 3 is a top plan view of a clamping device.

Fig. 4 is a sectional view of the bearing parts taken on the lines IV—IV of Fig. 1.

Referring to the drawing there is shown in Fig. 1 a turret 10 having a top portion 11 provided with a series of radially extending openings 12 for receiving the ends of the various tools employed in a machining operation.

The turret has a relatively large area base portion 13 and an annular skirt 14 extending downwardly from the substantially flat base portion. The base of the turret is provided with a plurality of tapered holes 16 which are positioned around the base surface in a circumferentially spaced relation corresponding to the spacing of the radially extending openings 12. These holes are provided for receiving the tapered end 17 of an index pin 18 which may be moved vertically by the arm 19 in any conventional manner well known to the art.

The turret is mounted for rotation on a turret slide 21 as hereinafter described in detail. The turret slide is adapted to be bodily moved on the bed 22 of the lathe in a manner well known to the art. The upper portion of the turret slide 21 has a relatively smooth flat surface 23 corresponding in area to that of the base 13 of the turret. The surfaces 13 and 23 are preferably machined or otherwise shaped and finished into substantially smooth, flat surfaces so that relative movement between the turret 10 and the turret slide 21 may take place even though the clearance between these surfaces is slight. The turret slide 21 is provided with an opening 26 in which the index pin 18 is mounted for movement into and out of the tapered holes 16.

The turret 10 is supported for rotation with respect to the turret slide 21 by means of a stub shaft 27 extending upwardly from the turret slide and in the center thereof as illustrated in Figure 1. The shaft 27 is preferably wedged in an opening 28 of the turret slide so as to be non-rotatable with respect thereto. The shaft 27 is provided with an annular projection 29 which rests on the top edges of the opening 28.

The turret is provided with a gear 31 fitting loosely over the annular projection 29 and which is keyed to the inner wall of the downwardly hanging skirt 14 as indicated at 30. The lower corner of the gear 31 is exposed below the edge of the annular skirt 14 and carries beveled teeth. The teeth of the gear 31 are adapted to be engaged by a beveled pinion gear 32 fixed on the stop shaft 33 by means of a pin 34.

In order that the turret will be more substantially mounted for rotation on the turret slide 21 and so that the turning may be effected with a minimum effort an antifriction bearing is provided for supporting and otherwise functioning to improve the operation of the device. The bearing as shown in Figures 1 and 4 comprises a solid inner ring or race 37 which is adapted to be wedged over the end of the stub shaft 27 to be thus positioned above the annular projection 29. The outer face of the solid ring slopes inwardly at the top as shown in Figures 1 and 2 and this face provides a bearing surface for a plurality of rollers 39. Each edge of the ring 37 is provided with an annular flange 38 so as to substantially embrace the ends of each roller 39. The outer race or ring 41 is also tapered when viewed in cross-section. That is to say, the inner surface slopes outwardly at the bottom and the inner surface of the ring 41 is adapted to rest on the arcuate surfaces of the rollers 39. Referring particularly to Figure 4 it is to be noted that the outer race or ring 41 is split or cut as indicated at 42. The outer face of the split ring is adapted to fit the inner wall of the central opening provided in the turret 10 to thus more positively prevent the turret from wabbling on the shaft 27.

The anti-friction device also acts somewhat in the nature of a thrust-bearing by having a generally cup-shaped spring diaphragm 43 inverted in a position over the bearing in such a manner that the edges of the cup rest on the top edge of the outer race or split ring 41. The central top portion of the spring diaphragm is provided with a projection 44 which engages a bearing adjustment nut 46 carried by the turret 10. The weight of the turret 10 is thus supported by the adjustment nut 46 resting on the diaphragm 43 which in turn bears on the race 41. The split ring 41 being supported by the rollers 39 thereby carry the weight of the turret. In this connection it is to be noted that the split ring 41 cannot expand sufficiently to escape the rollers 39 since the outer face engaged the inner wall of the central opening in the turret.

The spacing of the spring diaphragm 43 with respect to the anti-friction bearing may be accomplished by means of the adjustment nut 46 which is threaded in the central opening of the turret 10. Notches 47 provided in the nut may thus be engaged with a suitable wrench or the like to turn the nut and effect the adjustment. The nut 46 may be maintained in a proper adjusted position by means of a lock screw 48 having a soft metal pad 49 such as lead under the end thereof.

In making the adjustment the nut 46 is threaded downwardly until a slight pressure is exerted on the spring 43. That is to say the nut 46 is moved with respect to the turret 10 until the weight is carried by the spring diaphragm. The weight is then supported on the upper edge of the shoulder or annular projection 29 through the anti-friction bearing. Such adjustment of the nut 46 will provide a slight clearance between the surfaces 13 and 23 and permit the turret to be rotated when the end 17 of the index pin 18 is retracted from the opening 16.

After the turret has been rotated to position a particular tool carried in one of the openings 12 in a work-engaging position the turret 10 may be locked by means of a clamping ring 51. The ring 51 has tapering inner faces 52 and 53 which are adapted to fit over and substantially match the sloping surfaces 54 and 56 carried respectively by the turret 10 and the turret slide 21. The ring 51 is split as indicated at 55 in Figure 3 and is provided with any well known device such as a cam 57 moved by a lever 58 to cause the effective diameter of the ring to be made smaller. The ring may have sufficient inherent yieldability to cause it to expand or a spring 59 may be provided between the ends of the clamp to cause the diameter thereof to be enlarged when the cam 57 is moved to the position illustrated in Figure 3.

In operation of the turret having the weight thereof carried by the anti-friction bearing and the spring diaphragm 43, the turret may be easily rotated by permitting the stop shaft 33 to turn when the clamping ring 51 is in an expanded position as shown in Figures 2 and 3. In the unlocked position the spring diaphragm 43 carries the weight of the turret in such a manner as to provide a slight clearance between the surfaces 13 and 23. The turret may therefore be readily rotated to bring a tool carried in an opening 12 to proper position for engaging a work-piece on the lathe. When the particular tool is properly indexed the diameter of the clamping ring 51 is made smaller by means of the cam 57 to cause the surfaces 13 and 23 to be moved together. This bodily movement of the turret with respect to the turret slide 21 is accomplished by the sloping surfaces 52 and 53 acting on the tapered surfaces 54 and 56. The relatively large area of the surfaces 13 and 23 provide a firm support for the turret 10. When these surfaces are moved towards each other the spring diaphragm 43 yields as shown in Fig. 1 to cause the outer race or split ring 41 to move downwardly with respect to the rollers 39. This downward movement of the race expands the same to positively wedge the outer surface against the central opening of the turret 10. Any clearance caused by wear or temperature variation in the bearing parts is eliminated by the expansion of the split ring 41. The upper portion of the turret is thus positively held in a position to prevent any possible wobbling thereof. This yieldable movement of the turret 10 also causes the end 17 of the index pin 18 to be wedged within the opening 16 to thus more accurately lock the turret in a proper non-rotatable position.

While a split ring has been shown and described as a part of the anti-friction bearing for carrying out the desirable feature of moving the turret bodily into firm engagement with the turret slide, it is to be understood that a solid ring may be employed in place of the split ring or race 41.

In other words the essential feature of the present invention resides in the provision and arrangement of the yieldable member 43 and a solid ring may be properly fitted in the central opening of the turret to rest on the roller 39.

Although the preferred embodiment of the invention has been described it is apparent that modifications may be made by those skilled in the art. Such modifications may be made without departing from the spirit and scope of the invention as set forth in the appended claims.

I claim:

1. In a turret lathe, a slide, a shaft extending upwardly from said slide, a bearing carried by said shaft, said bearing having anti-friction members arranged angularly with respect to said shaft, a split tapered ring resting on said members, an inverted cup-shaped yieldable diaphragm having the edge thereof resting on said split ring, a turret having a central opening therein, said diaphragm engaging said turret to support the weight thereof on said bearing, means for bodily moving said turret towards said slide, whereby said diaphragm yieldably expands said split ring into firm engagement with said turret and said anti-friction members.

2. In a turret lathe, a slide, a shaft extending upwardly from said slide, an annular projection on said shaft, a ring resting on said projection, the outer surface of said ring sloping inwardly towards the top thereof, a plurality of rollers resting on said sloping surface, a split ring having an inner surface sloping inwardly towards the top thereof and resting on said rollers, a turret having a central opening, the outer surface of said split ring engaging the wall of said opening, a yieldable member resting on said split ring and engaging said turret, whereby said turret may be rotated with respect to said slide on said rollers, and means for moving said turret bodily towards said slide whereby said member yieldably forces said split ring into firm engagement with the wall of said central opening and said rollers.

3. In a turret lathe, a slide, a shaft extending upwardly from said slide, an annular projection on said shaft, a ring resting on said projection, the outer surface of said ring sloping inwardly towards the top thereof, a plurality of rollers resting on said sloping surface, a split ring having an inner surface sloping inwardly towards the top thereof and resting on said rollers, a turret having a central opening, the outer surface of said split ring engaging the wall of said opening, a yieldable member resting on said split ring and engaging said turret, means for adjusting the position of said yieldable member with respect to said turret, whereby said turret may be rotated with respect to said slide or said rollers, and means for moving said turret bodily towards said slide whereby said member yieldably forces said split ring into firm engagement with the wall of said central opening and said rollers.

4. In a turret lathe, a slide, a shaft extending upwardly from the slide, a bearing carried by said shaft, said bearing having anti-friction members arranged angularly with respect to the shaft, a tapered ring resting on said members, a turret, an inverted cup-shaped yieldable member having the edge thereof resting on said ring for supporting the weight of the turret on said bearing, and means for bodily moving said turret towards said slide whereby said cup-shaped member yieldably urges said ring into firm engagement with the anti-friction members.

5. In a turret lathe, a slide, a shaft extending upwardly from said slide, a bearing carried by the shaft having anti-friction members arranged angularly with respect to the shaft, a ring having a tapered inner surface resting on said members, a turret, an inverted cup-shaped yieldable diaphragm interposed between the turret and the bearing and having the edge thereof resting on said ring, a projection extending from the inverted base of the diaphragm, means carried by the turret engaging said projection, and means for bodily moving the turret towards said slide whereby the diaphragm yields by the pressure applied to said projection so as to urge the ring into firm engagement with the anti-friction members.

WILLIAM R. GORHAM.